(12) United States Patent
Geraud et al.

(10) Patent No.: US 11,625,713 B2
(45) Date of Patent: Apr. 11, 2023

(54) METHOD FOR SECURING TRANSACTIONAL DATA PROCESSING, CORRESPONDING TERMINAL AND COMPUTER PROGRAM

(71) Applicant: Banks and Acquirers International Holding, Paris (FR)

(72) Inventors: Remi Geraud, Antony (FR); Hiba Koudoussi, Paris (FR)

(73) Assignee: BANKS AND ACQUIRERS INTERNATIONAL HOLDING, Paris (FR)

( * ) Notice: Subject to any disclaimer, the term of this patent is extended or adjusted under 35 U.S.C. 154(b) by 640 days.

(21) Appl. No.: 15/335,868

(22) Filed: Oct. 27, 2016

(65) Prior Publication Data

US 2017/0116609 A1    Apr. 27, 2017

(30) Foreign Application Priority Data

Oct. 27, 2015  (FR) ...................................... 1560270

(51) Int. Cl.
*G06Q 20/38*   (2012.01)
*G06Q 20/32*   (2012.01)
(Continued)

(52) U.S. Cl.
CPC .......... *G06Q 20/382* (2013.01); *G06F 21/34* (2013.01); *G06Q 20/327* (2013.01);
(Continued)

(58) Field of Classification Search
CPC ............... G06Q 20/40; G06Q 20/4012; G06Q 20/4018; H04L 2209/56; G06F 21/77
See application file for complete search history.

(56) References Cited

U.S. PATENT DOCUMENTS 5,680,610 A * 10/1997 Smith .................. G06F 11/3684
5,805,164 A *  9/1998 Blum ..................... G06F 3/0489
                                                      715/780
(Continued)

FOREIGN PATENT DOCUMENTS

WO    WO-2010079559 A1 *  7/2010  ........... G06K 9/3266

OTHER PUBLICATIONS

NPL—ISBN 0-7356-1495-4, 2002, USA, Microsoft Computer Dictionary.—5th ed.*

(Continued)

*Primary Examiner* — Neha Patel
*Assistant Examiner* — Jahed Ali
(74) *Attorney, Agent, or Firm* — David D. Brush; Westman, Champlin & Koehler, P.A.

(57) ABSTRACT

A method for securing the processing of transactional data is disclosed. The method is implemented within a communications terminal comprising a transactional data processing module. The method has: a step for the detection, by the processing module, of a display of at least one entry area relating to a piece of payment means data; a step for the activation, by the processing module, of a contactless data reading module; a step for the obtaining, by the contactless data reading module, of at least one piece of payment means data coming from a payment means; and a step for the furnishing, at said at least one entry area, of at least one piece of payment means data previously obtained.

9 Claims, 3 Drawing Sheets

(51) Int. Cl.
*G06Q 20/40* (2012.01)
*G06F 21/34* (2013.01)

(52) U.S. Cl.
CPC ..... *G06Q 20/3278* (2013.01); *G06Q 20/4014* (2013.01); *G06Q 20/4018* (2013.01); *G06Q 2220/00* (2013.01)

(56) References Cited

U.S. PATENT DOCUMENTS

| | | | | |
|---|---|---|---|---|
| 8,566,601 B1* | 10/2013 | Waters | ................... | H04L 9/3073 713/182 |
| 2004/0139029 A1* | 7/2004 | Zhang | ................... | H04L 9/083 705/74 |
| 2009/0287921 A1* | 11/2009 | Zhu | ................... | G06Q 10/02 713/155 |
| 2010/0082444 A1* | 4/2010 | Lin | ................... | G06Q 20/204 235/383 |
| 2010/0313115 A1* | 12/2010 | Varone | ................... | G06F 16/986 715/234 |
| 2011/0140841 A1* | 6/2011 | Bona | ................... | G07F 7/0846 340/5.83 |
| 2011/0184867 A1* | 7/2011 | Varadarajan | ........... | G06Q 20/04 705/44 |
| 2011/0225090 A1 | 9/2011 | Hammad | | |
| 2011/0225094 A1* | 9/2011 | Hammad | ............. | G06Q 20/401 705/75 |
| 2011/0270757 A1* | 11/2011 | Hammad | ............... | G06Q 20/12 705/44 |
| 2012/0221474 A1* | 8/2012 | Eicher | ................... | G09C 5/00 705/51 |
| 2013/0073818 A1* | 3/2013 | Wakerly | ............. | G06Q 20/3574 711/156 |
| 2013/0226799 A1* | 8/2013 | Raj | ................... | G06Q 20/401 705/44 |
| 2014/0074655 A1* | 3/2014 | Lim | ................... | G06Q 20/387 705/26.35 |
| 2014/0076967 A1* | 3/2014 | Pushkin | ................... | G06F 21/42 235/380 |
| 2014/0143151 A1* | 5/2014 | Dhar | ................... | G06Q 20/227 705/44 |
| 2015/0127838 A1* | 5/2015 | Li | ................... | H04L 67/02 709/227 |
| 2016/0026997 A1* | 1/2016 | Tsui | ................... | G06Q 20/322 705/75 |
| 2016/0142206 A1* | 5/2016 | Canard | ................ | H04L 9/0869 380/46 |
| 2016/0224973 A1* | 8/2016 | Van Os | ............. | G06Q 20/3276 |
| 2017/0116609 A1* | 4/2017 | Geraud | ............. | G06Q 20/4014 |
| 2018/0359100 A1* | 12/2018 | Gaddam | ................ | H04L 9/3263 |
| 2019/0036678 A1* | 1/2019 | Ahmed | ................... | H04L 9/006 |
| 2019/0066095 A1* | 2/2019 | Spector | ................ | G06Q 20/227 |
| 2019/0294287 A1* | 9/2019 | Kim | ................... | G06F 3/0481 |
| 2021/0174355 A1* | 6/2021 | Gupta | ................... | G06Q 20/367 |

OTHER PUBLICATIONS

L. Kyrillidis, K. Mayes, B. Chazalet and K. Markantonakis, "Card-Present Transactions on the Internet Using the Smart Card Web Server," 2013 12th IEEE International Conference on Trust, Security and Privacy in Computing and Communications, 2013, pp. 611-619, doi: 10.1109/TrustCom.2013.75. (Year: 2013).*

Preliminary Search Report with regard to FR 1560270 dated Jun. 21, 2016.

Search report for corresponding European Application No. 16195082. 9, dated May 19, 2020, 12 pages.

* cited by examiner

METHOD FOR SECURING TRANSACTIONAL DATA PROCESSING, CORRESPONDING TERMINAL AND COMPUTER PROGRAM

CROSS-REFERENCE

The present application claims priority to French Patent Application No. 1560270, filed Oct. 27, 2015, the entirety of which is incorporated herein by reference.

FIELD OF TECHNOLOGY

The invention relates to the field of transactional processing. More particularly, the proposed technique relates to the processing of transactional payment data that has to be secured. Thus, it is an object of the present technique to provide security to data exchanges when a transaction is made. More specifically again, it is an object of the present technique to increase the security level of a data transmission in the context of payment made with a smart mobile terminal (for example a smartphone or a tablet) and a payment card.

BACKGROUND

The use of smart mobile terminals (for example smartphones or tablets) is constantly developing. This development can be seen also seen when payment has to be made for example on a merchant's Internet site. Thus, the number of transactions made on a smart mobile terminal is increasing day by day. It would seem that this number could increase even more. More specifically, there are traditionally two ways of making a payment on terminals of this type.

In the first type, payment is made directly to a given merchant through a dedicated application. For example, the merchant has an electronic commerce or e-commerce application that is installed on the user's terminal. The user can make a purchase by selecting one or more items or services and by making payment by bank card (entering or selecting data pre-entered in a payment field provided for this purpose).

The second type uses a browser (a software program that enables browsing on an Internet site) to visit the merchant's Internet site. The Internet site comprises for example an interface dedicated to the mobile terminals in order to facilitate browsing on small-sized screens. When the user selected his items or services, he makes payment. This often requires the entry, on the payment interface, of bank card data (name, number, expiry date and verification code (CVV)). Now, this kind of entry made in an interface that is not specifically dedicated to this purpose can raise problems. Indeed, the small size of the characters displayed combined with the way in which the virtual keypad (the keypad displayed on the terminal screen) masks about half of the surface displayed on the screen makes the entry of bank card data complicated for the user. This results in a limited conversion rate (rate of conversion of orders into real purchases).

To facilitate the act of purchase, two solutions are used: the first solution consists of the recording, in a remote server, of bank card data during a first purchase (this is called an enrolment phase). In this first solution, the operations made consist especially in associating the user's bank card data with the existing user account. Thus, during his subsequent purchase, the user will be capable of directly selecting data already entered to pay for his purchases. This solution is valuable but has the enormous disadvantage of requiring the recording of the user's data with each merchant: each merchant uses his own database and his own architecture for managing customer accounts. Thus the user must nevertheless enter his bank card data as soon he wishes to make an online purchase on a website or in an application that he has not used before.

The second solution uses the properties of certain browsers: they themselves memorize the entries made by the user. Since many Internet sites use entry fields that have identical names, the automatic memorizing function of the browser can be used to enter information in these fields more speedily. This solution can be implemented easily but presents many problems: this solution is limited to websites; websites do not all use the same name for the given entry field; the websites normally use an encrypted connection (https) for payment that does not allow for entry of this type.

Thus, there is a need for a simple, low-cost and speedy solution for entering bank card data relative to a payment to be made. Besides, there is a need for a solution that is also secured. Indeed, one of the problems encountered also concerns the authentication of both the user and the payment means. It is therefore necessary in a complementary manner to have available a solution that is efficient in terms of securing.

SUMMARY

The present technique resolves at least some of these problems of the prior art. More particularly, the proposed technique relates to a method for securing the processing of data coming from a contactless payment means. Such a method also comprises the automatic acquisition of data coming from the payment means on the one hand and the securing of the transmission and processing of this data within a communications network on the other hand, so that it can be processed.

The technique thus relates to a method for securing the processing of transactional data, a method implemented within a communications terminal comprising a transactional data processing module. Such a method comprises:
  a step for the detection, by the processing module, of a display of an entry area relating to a piece of payment means data;
  a step for the activation, by the processing module, of a contactless data reading module;
  a step for the obtaining, by the contactless data reading module, of at least one piece of payment means data coming from a payment means;
  a step for the furnishing, at the entry area, of at least one piece of payment means data previously obtained.

Thus, the proposed technique very substantially simplifies the entry of data needed for the transaction. Indeed, the user merely presents his (contactless) payment means to the communications terminal so that it is read and so that the processing module automatically sets the value of the data needed for the processing.

Depending on embodiments and needs, the pieces of data obtained by the transactional module of the communications terminal are for example the family name, the first name, the bank card number, the expiry date, the visual verify code.

According to one particular characteristic, the method for securing processing comprises a step for the generation, by the processing module, of a current authentication code as a function of an identification of the communications terminal.

According to one particular characteristic, the step for generating the current authentication code comprises:
- a step for obtaining a piece of identification data of the communications terminal;
- a step for obtaining a piece of authentication data of said user with which said communications terminal is associated;
- a step of encryption of said piece of identification data of the communications terminal and of said piece of authentication data of said user, delivering the current authentication code.

According to one particular characteristic, the method for securing the processing comprises a step for furnishing said current authentication code in a pre-selected entry area.

Thus, in addition to the usual data, usually entered by a user in the data entry boxes provided for this purpose (family name field or area, first name area, date of validity of the card number), the method secures the transaction through the entry of a piece of data computed within the terminal itself. This piece of data ensures that the transaction is made within an identified terminal.

According to one particular characteristic, the current authentication code is provided in an entry area for a bank card verification code.

Thus, the proposed technique does not require the implementation of a new entry area. Indeed, using the entry area for the card verification code or "card verification value" means that it is not necessary to develop or redevelop new applications and especially new payment applications (for example on Internet sites and/or in merchant applications).

At the end of the implementation of this technique, according to this last characteristic, the fields needed for payment have been entered automatically. In addition, the verification code field comprises the previously generated authentication code. The user is therefore capable of validating the payment.

According to one particular characteristic, this method furthermore comprises a preliminary step for obtaining a value of the occurrence of implementation of the method for securing processing, and when it is the first occurrence of implementation of the method, the method comprises a step for creating a piece of data representing a link between the communications terminal and a transaction processing server.

Thus, during the first implementation of the service, it is possible to set up a strong link between the communications terminal and one or more servers in charge of implementing the transaction. This is for example a server of a payment services provider.

According to one particular characteristic, the step for creating a piece of reference authentication data between the communications terminal and a transaction processing server comprises:
- a step for obtaining a piece of identification data of the communications terminal; a step for obtaining a piece of authentication data for said user with whom said communications terminal is associated;
- a step of encryption of said identification data of said communications terminal and said authentication data of said user, delivering data representing the link between the payment terminal and the server of the payment services provider;
- a step for transmitting said piece of reference authentication data to a server of the payment services provider.

According to another aspect, the present technique also relates to a method for securing transaction data processing within a server.

According to one particular characteristic, the method comprises, during the reception of the data coming from said at least one zone of entry by a processing server, at least one step of comparison between at least one piece of data transmitted within said entry area and the piece of reference authentication data, delivering an assertion of validation of the transaction.

According to another aspect, the invention also relates to a smart communications terminal characterized in that it comprises a processing module for processing transactional data and a module for obtaining contactless data, characterized in that the processing module comprises:
- means for detecting a display of at least one entry area for a piece of payment means data;
- means for activating the contactless data reading module;
- means of the obtaining, by means of the contactless data reading module, of at least one piece of payment means data coming from a payment means;
- means of furnishing, to said at least one entry area, of at least one previously obtained piece of payment means data.

According to a preferred implementation, the different steps of the method according to the proposed technique are implemented by one or more software programs or computer programs comprising software instructions to be executed by a data processor of a relay module according to the proposed technique and designed to control the execution of the different steps of the method.

The invention is therefore aimed at providing a program capable of being executed by a computer or a data processor, this program comprising instructions to command the execution of the steps of a method as mentioned here above.

This program can use any programming language whatsoever and can be in the form of a source code, object code or intermediate code between source code and object code, such as in a partially compiled form or in any other desirable form whatsoever.

The invention also seeks to provide an information carrier readable by a data processor and comprising instructions of a program as mentioned here above.

The information carrier can be any entity or device whatsoever capable of storing the program. For example, the carrier can comprise a storage means such as a ROM, for example a CD ROM or a microelectronic circuit ROM or again a magnetic recording means, for example a floppy disk or a hard disk drive, a flash memory or a storage memory of another type.

Again, the information carrier can be a transmissible carrier such as an electrical or optical signal which can be conveyed via an electrical or optical cable, by radio or by other means. The program according to the invention can especially be uploaded to an Internet type network.

As an alternative, the information carrier can be an integrated circuit into which the program is incorporated, the circuit being adapted to executing or to being used in the execution of the method in question.

According to one embodiment, the invention is implemented through software and/or hardware components. In this respect, the term "module" can correspond in this document equally well to a software component as to a hardware component or again to a set of hardware and software components. A software component corresponds to one or more computer programs, one or more sub-programs of a program or more generally to any element of a program or a piece of software capable of implementing a function or a set of functions as described here below for the module concerned. Such a software component is executed by a data processor of a physical entity (terminal, server, gateway, router, etc.) and is capable of accessing the hardware resources of this physical entity (memories, recording media, communications buses, input/output electronic boards, user interfaces, etc.)

In the same way, a hardware component corresponds to any element of a hardware unit capable of implementing a function or a set of functions as described here above for the module concerned. It can be a programmable hardware component or a component with an integrated processor for the execution of software, for example an integrated circuit, a smartcard, a memory card, an electronic board for the execution of firmware, etc.

Each component of the previously described system naturally implements its own software modules.

The different embodiments mentioned here above can be combined with each other to implement the invention.

BRIEF DESCRIPTION OF THE FIGURES

Other features and advantages shall appear more clearly from the following description of a preferred embodiment, given by way of a simple illustratory and non-exhaustive example and from the appended drawings, of which.

DESCRIPTION

Reminder of the principle:

The general principle of the present technique relies firstly on the implementing of a smart communications terminal comprising means for obtaining data coming from a payment means. More specifically, a means for obtaining data coming from a payment means takes the form of a contactless communications module, such a module being more specifically a near-field communications (NFC) module. This module receives an instruction or a command, from a processor of the communications terminal, for obtaining contactless data. It may be a general command. Besides, this module is connected to a contactless antenna. This contactless antenna is used to send out a signal to the payment means and to receive a signal coming from this payment means.

The general principle of the present technique relies firstly on the implementing of an application installed within the smart communications terminal, the application comprising means for detecting and filling entry fields for payment means data.

A contactless payment means takes the form for example of a payment card (or credit card or debit card) comprising an NFC (near-field communication) type antenna, this antenna comprising means for transmitting data to a receiver when it receives a request to this effect from this receiver (the request taking for example the form of an electromagnetic signal). The antenna, called a contactless antenna, can be connected to a processor. This processor can for example be the chip of the smartcard or an additional processor embedded in the substrate of the card (like the antenna too). Accessorily, a contactless payment means can also take the form of a communications terminal (a second communications terminal) which is provided with contactless data transmission means and, possibly, an application specifically intended to transmit data equivalent or identical to payment card data. Such an application can for example be a bank application installed within the communications terminal and preserving data in a secured way. In this case, for example, the technique is implemented by placing this second communications terminal on the first communications terminal. Such an implementation is quite feasible since as many individuals have both tablets and smartphones: the smartphone has the bank application at its disposal while the tablet is used more generally and more freely by several persons in the home and is not intended for the holding of confidential data.

Figure 1:
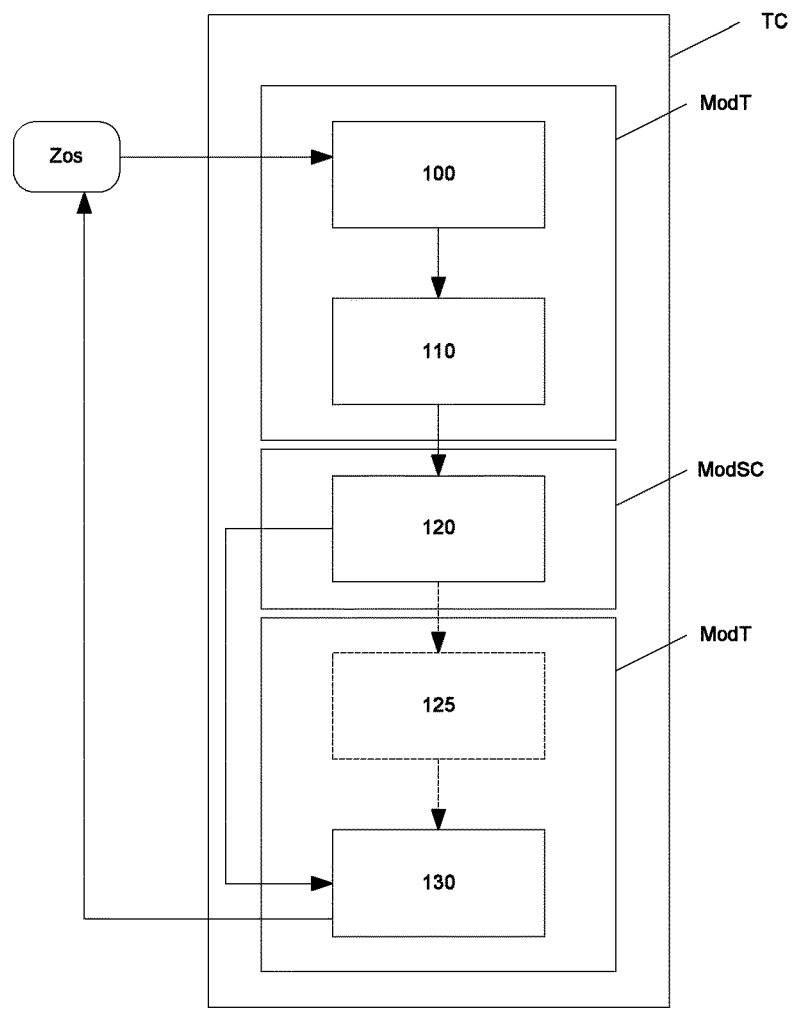
FIG. 1 is a block diagram of the general method implemented for the facilitated entry of the payment data within a form.
Figure 2:
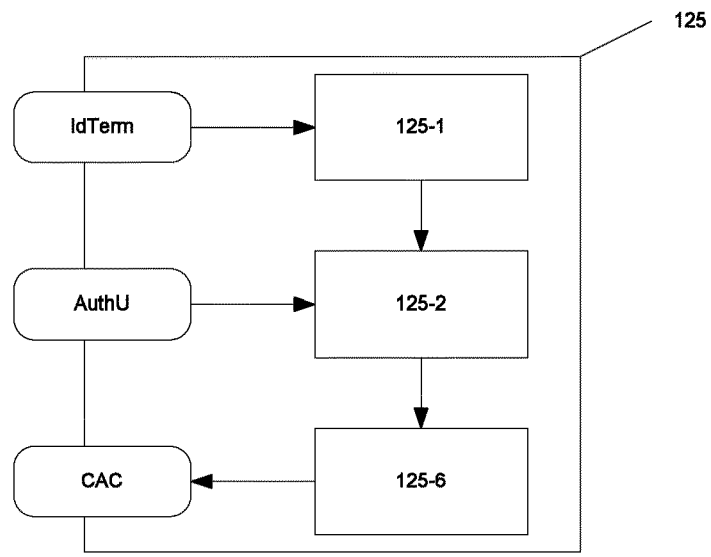
FIG. 2 describes the general steps implemented during the creation, by the communications terminal, of a current authentication code.

Referring to FIGS. 1 and 2, we present the different steps of implementing the method according to the present invention from a general viewpoint. The implementing of the method, preliminarily comprises the selection, within an application or a browser, of one or more items of goods or services that the user wishes to acquire. When the user has selected what he wishes to acquire, he goes into the payment phase. This payment phase starts with the display of a screen (HTML page or page of an application) comprising entry fields for payment means data (for example bank card data). Then the method of the present technique can be implemented. This general method comprises firstly a method implemented on the communications terminal side and secondly a method implemented on the server side (server of the payment service provider for example or directly the bank server). For the requirements of the present invention, the two methods are presented as being closely linked together so as to provide the clearest possible description of the method of processing. It is clear however that these methods can be implemented independently. The general method of treatment is now described with reference to FIG. 1.

During the screen display comprising the data entry fields of a piece of data needed for payment, the following operations are performed:

a processing module (ModT) installed within the communications terminal (TC) (for example in the form of a particular application), detects (100) the display of these entry areas; to this end, the processing module (ModT) implements a special technique which is not the object of the present invention;

this processing module (ModT) then activates (110) the contactless data reading module (ModSC); complementarily, the processing module (ModT) takes possession of the display made on the communications terminal; this taking of possession is done in the form of an interruption of the requesting application (application specific to the merchant or browser); the requesting application is "frozen" and the processing module (ModT) transparently, in a highlighted form, displays for example the contactless payment logo;

the user uses his payment means: the user places his payment means on the communications terminal;

the contactless data reading module (ModSC) then obtains (120), by means of a request and a response from the payment means, the data needed for payment. The number and the designation of this data varies according to the requirements of the regulations and the practices of the merchants and the payment service providers; typically, the data obtained are: the surname, the first name, the expiry date and the bank card number and the verification date code;

the contactless data reading module transfers the data obtained to the processing module (ModT) of the communications terminal; the processing module (ModT) then fills (130) the entry areas according to the data received from the payment means: the processing module (ModT) allots the data received to the previously identified zones; the processing module (ModT) at the same time gives control back to the requesting application and cancels the display of the contactless payment logo (if it is being displayed).

In a first embodiment of the present technique, the operations performed above are sufficient. All that the user then has to do is to verify and validate the data entered. The rest of the payment process is identical to the existing one and the transaction follows its course as usual.

Complementarily, in other more secured embodiments, it is made sure that the terminal and the user carrying out the payment operation are truly authorized to do so. Such an embodiment is especially presented with reference to FIGS. 1 and 2. To this end, in these complementary embodiments, the processing module (ModT) of the communications terminal implements a step (125) for creating a current authentication code (CAC). The creation of this current authentication code (CAC) includes the following steps:

a step (125-1) for obtaining a piece of identification data for identifying the communications terminal (IdTerm); such an identification data, depending on the embodiments can, for example, be a serial number, an IMSI (International Mobile Subscriber Identity), an IMEI (International Mobile Equipment Identity) or any other code or again a combination of these codes;

a step (125-2) for obtaining a piece of authentication data of said user (AuthU) with which said communications terminal is associated; such a piece of authentication data can be a function of the embodiment, a biometric piece of data (for example a fingerprint signature or a voice print) or again a personal identification code (of the PIN type);

an encryption step (125-6) for encrypting said identification data of the communications terminal and said authentication data of said user, delivering the current authentication code (CAC); this encryption step which is described in detail here below consists of the encryption and/or hashing of the previously obtained data and of the production of an authentication code; naturally, in a complementary way, the data are encrypted or hashed with one or more encryption keys at the disposal of the processing module (ModT) of the user's communications terminal.

Once the processing module (ModT) has the current authentication code (CAC) available, it furnishes this current authentication code (CAC) to the requesting application. This furnishing of this current authentication code can be done in several ways (for example by filling an "authentication code" field on the entry screen). According to one advantageous embodiment, however, the authentication code takes the place of the verification code "CVV". Thus, instead of the CVV, which can be obtained by contactless reading using the payment means (as indicated here above), this CVV entry field is filled with the current authentication code (CAC). Advantageously, the mode of computing the current authentication code comprises at least one formatting step so that the size of the current authentication code corresponds to a size accepted by the entry area relating to the CVV. Thus, there is no difficulty with inserting the CAC into the area planned for the CVV.

This means from the viewpoint of the payment services provider, the process for validating the transaction is somewhat different from the one usually implemented. Indeed, the validation, by the user, of the payment data entry form prompts the transmission (directly or indirectly: i.e. by means of the merchant's server) of these pieces of payment data to the processing server of the payment services provider. This means that the server of the payment services provider (PSP server) implements the following steps:

receiving payment data (comprising especially data automatically entered and the current authentication code (CAC));

checking the validity of the current authentication code (CAC); and when the current authentication code (CAC) is valid, validating the transaction;

when the current authentication code (CAC) is invalid, rejecting the transaction.

Depending on the embodiments, the checks on the validity of the current authentication code (CAC) are implemented in several different ways:

either the current authentication code (CAC) is directly compared with a reference authentication code, previously received from the user and from the communications terminal (for example during the first implementing of the service, as is explained here below); in this case, a simple comparison is made;

or the pieces of data of the current authentication code (CAC) are used to decide on the validity of the transaction, relative to the data previously received; this aspect is also described here below.

When the pieces of data of the current authentication data (CAC) are used to carry out a validation of the transaction, the following steps are implemented:

decrypting the current authentication code (CAC); this decryption is implemented by using a secret shared between the server of the payment service provider and the communications terminal of the user; this secret has been shared during a phase of registration with the payment services server; one embodiment of this phase of registration and of sharing data is described here below;

verification of the decrypted data: this data is for example the identification data of the communications terminal and the user's authentication data.

Thus, the implementing of the technique described makes it possible firstly to facilitate the online payment operations for the users and secondly provides additional securing of these online payment operations.

Here below, we describe an embodiment of the securing operations. It is clear however that this embodiment only illustrates the securing operations that can be performed. More particularly, it is clear that other embodiments based for example on the possession of private keys/public keys pairs by the different actors (communications terminal, server of the payment provider) can also be implemented without departing from the framework of the present invention.

DESCRIPTION OF ONE EMBODIMENT

In this embodiment, we present the way in which the processing server comes into possession of the equipment needed for a subsequent check of the current authentication code (CAC) (this step is called a registration step).

This embodiment also presents the way in which the current authentication code (CAC) is produced by the processing module (ModT) of the communications terminal. In this embodiment, we also present the way in which the processing server verifies a current authentication code (CAC).

To this end, we consider the data of a symmetric bilinear coupling e: G×G→H with a small-sized group H. It may be recalled that such a function verifies, for all integers x, y and all the points g, h of G:

$$e(g^x, h^y) = e(g, h^y)^x = e(g^x, h)^y = e(g, h)^{xy}$$

$$e(g, h) = e(h, g)$$

This bilinear coupling is used both for the registration step and for the steps of subsequent verification. Typically, the size of the group is 128 bits. Such a group is considered to be small-sized as compared with the usual size of these groups (typically 256 bits, or even 512 bits). This means that, in this application, the group comprises numbers the length of which is a maximum of 128 bits. This group comprises for example $2^{128}$ elements: these elements are not (necessarily) numbers. In the application considered, for example, these are points of an elliptical curve. But they could be any object adapted to the present technique.

In this embodiment, it is possible to use a Tate pairing which is defined on any elliptical curve. However, for reasons of security and performance, it is possible to use Barreto-Naehrig curves. Such a bilinear pairing can for example be computed by using Miller's algorithm. These elements are given by way of indications. Indeed, any pairing whatsoever can be appropriate. However, this particular pairing has the two-fold advantage of efficiency (it is one of the fastest couplings) and of general applicability (it can be applied in a large majority of cases).

Registration with the Processing Server

T (T=idTerm, for greater notation facility) denotes the identification data given on the telephone during the registration, and B (B=AuthU, for greater notation facility) denotes the piece of authentication data given by the user. During the registration, the processing server transmits an element g of the group H and the communications terminal, in response, transmits the piece of data constituted by $\{g^T, g^B\}$.

In other words, the registration step comprises the following for the communications terminal in this embodiment:
  a step of reception coming from the processing server of an element g; typically such an element is an integer of the group H;
  a step of computation, by the processing module (ModT) of the communications terminal, of the data constituted by $\{g^T, g^B\}$;
  a step of transmission, by the communications terminal, of the piece of data computed previously.

This piece of data is recorded within the processing server. It is associated with the user's communications terminal.

Figure 3:
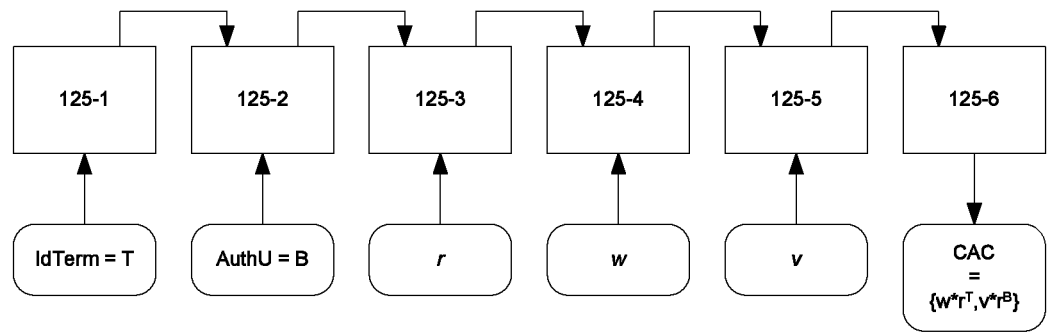
FIG. 3 describes the steps implemented during the creation, by the communications terminal, of a current authentication code according to one particular embodiment.

Creation of the current authentication code (CAC) by the communications terminal The creation of the current authentication code (CAC) is described with reference to FIG. 3. As above, the processing module obtains (125-1, 125-2) the identification data of the terminal (T) and the authentication data of the user (B). When the payment is being made, the processing module draws (125-3) a random number r; the processing module also marks (125-4) the time w, corresponding to the time at which the transaction is processed; the processing module also computes (125-5) the transaction information v (as for example the amount and/or the place of the transaction and/or the parties to the transaction). The processing module computes the current authentication code (CAC): $CAC = \{wr^T, vr^B\}$.

The current authentication code (CAC) as well as the name, card number and expiry date are transmitted to the processing server. The name, card number and expiry date can be encrypted with CAC during this transmission.

Checking the current authentication code (CAC) by the processing server

Figure 4:
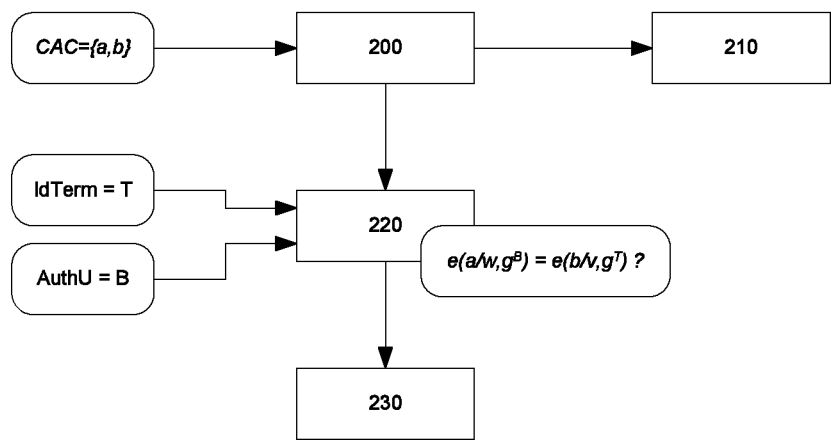
FIG. 4 describes the steps implemented by the payment provider server to validate a current authentication code according to one particular embodiment.

The checking of the current authentication code (CAC) is described with reference to FIG. 4. The processing server thus receives CAC={a, b} as a verification code. The processing server also receives the other data of the transaction. Since the processing server is in possession of T, the piece of identification data given by telephone during the registration and B, the piece of authentication data given by the user, it carries out the following computations:
  it divides (200) a by the time and checks that it has not received a same value of a/w during a predetermined time period (i.e. the last hour or the last 10 minutes, for example). If this happens, the transaction is cancelled (210).
  if not, it verifies (220) that:

$$e(a/w, g^B) = e(b/v, g^T)$$

If this equality is true, then the transaction is validated (230) (and as the case may be the name and the PAN can be decrypted by means of the CAC).

Naturally, this embodiment of the technique is described by way of illustration. It is described especially in the context of an implementation for online payment. It is understood that this technique can also be applied to any other type of payment and especially to payment implemented in a direct payment with a merchant. In this case, the principle described here above remains the same: instead of an automatic entry of bank card data on a screen, this data read is directly transmitted to a server of the merchant so that this it is transmitted and processed as if it were a payment being physically made with a bank card at a physical payment terminal of the merchant.

Figure 5:
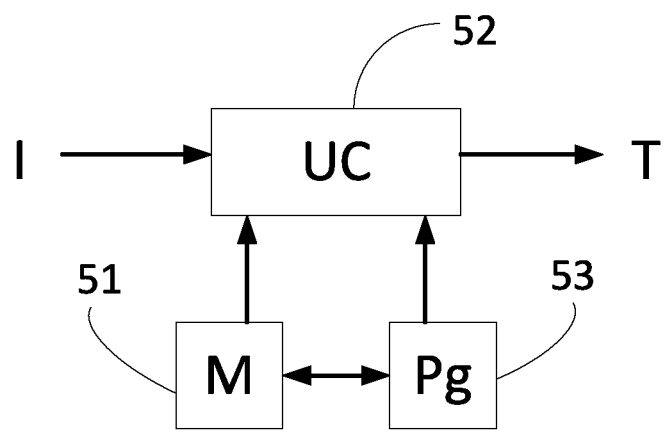
FIG. 5 is a brief description of the hardware architecture of a terminal adapted to implementing the present technique.

Other characteristics and advantages:

Referring to FIG. 5, we present a communications terminal comprising means for executing the method described here above.

For example, the communications terminal comprises a memory 51 constituted by a buffer memory, a processing unit 52, equipped for example with a microprocessor and driven by the computer program 53, implementing the steps needed for obtaining, filling, encryption and transmitting transactional processing data.

At initialization, the code instructions of the computer program 53 are for example loaded into a memory and then executed by the processor of the processing unit 52. The processing unit 52 inputs for example a screen or a form to be filled. The microprocessor of the processing unit 52 implements the steps of the method according to the instructions of the computer program 53 to enable the entry of data through a contactless payment means.

To this end, the processing device comprises, in addition to the buffer memory 51, means for identifying payment data entry areas, means for obtaining data from the contactless payment means (such as an NFC read module), means for obtaining encryption keys, means of encryption. The processing device also comprises:

means for detecting a display of at least one entry area relating to a payment means data; such means are represented for example in the form of a particular detection module;

means of activation, by means of the processing module, of a contactless data reading module; such means take for example the form of a connection circuit of said module;

means for the obtaining, by means of the contactless data reading module, at least one piece of payment means data coming from a payment means; these means take the form of a bank card interrogation module for example;

means for furnishing, to said at least one entry area, at least one piece of payment means data previously obtained, these means taking for example the form of an entry automaton.

These means can be driven by the processor of the processing unit 52 as a function of the computer program 53.

Figure 6:
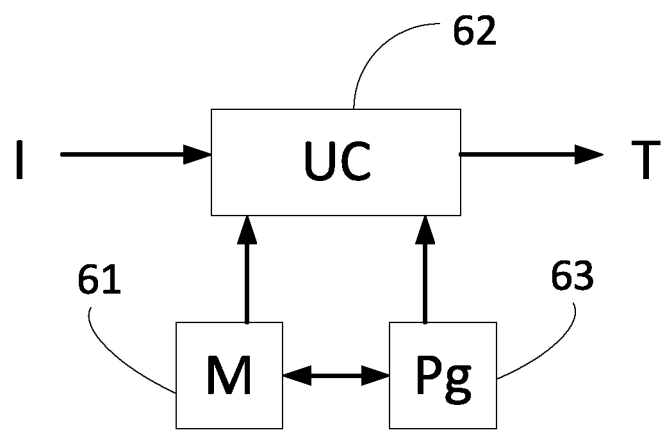
FIG. 6 briefly describes the hardware architecture of a server adapted to implementing the present technique.

Referring to FIG. 6, we describe a processing server comprising means for executing the method described here above.

For example, the processing server comprises a memory 61 constituted by a buffer memory, a processing unit 53, equipped for example with a microprocessor and driven by the computer program 63 needed to implement the functions for checking transactional data.

At initialization, the code instructions of the computer program 63 are for example loaded into a memory and then executed by the processor of the processing unit 62. The processing unit 62 inputs for example a set of encrypted data comprising for example a current authentication code (CAC). The microprocessor of the processing unit 62 implements the steps of the processing method according to the instructions of the computer program 63 to enable the decryption of the encrypted data and the verification of the current authentication code (CAC).

To this end, the computer comprises, in addition to the buffer memory 61, means for obtaining encryption/decryption keys; these means can take the form of a processor or a set of secured resources enabling the securing of the entry of authorization. The device also comprises cryptographic processing means; these processing means comprise for example a dedicated encryption processor. These means can be driven by the processor of the processing unit 62 as a function of the computer program 63.

What is claimed is:

1. A method for securing the processing of transactional data during a payment transaction, the method being implemented within a communications terminal running a processing application, wherein the method comprises:

detecting, by the processing application, a display, made by a requesting application, of a payment data entry form comprising at least one entry area relating to a piece of payment data, on a display screen of the communications terminal, the requesting application having initiated the payment transaction;

in response to the detecting, activating, by the processing application, a contactless data reading device;

in response to the detecting, taking control, by the processing application, of the display made on the display screen by interrupting the requesting application; and, when the display is under control of the processing application:

obtaining, by the contactless data reading device, at least one piece of payment data coming from a contactless payment device;

generating, by the processing application, a current authentication code having a bank card verification code format, the generating comprising:

obtaining a piece of identification data of the communications terminal;

obtaining a piece of authentication data of a user with whom the communications terminal is associated; and generating the current authentication code using a symmetric bilinear coupling function as a function of the piece of identification data of the communications terminal and the piece of authentication data of the user, the symmetric bilinear coupling function relying on Barreto-Naehrig curves;

filling, by the processing application, the at least one entry area of the payment data entry form with at least one piece of payment data previously obtained;

filling, by the processing application, in a pre-selected entry area of the payment data entry form corresponding to an entry area for a bank card verification code, with the generated current authentication code;

returning control of the display from the processing application to the requesting application; and upon validation of the payment data entry form, transmitting, by the requesting application, the at least one piece of payment data and the generated current authentication code to a transaction processing server, either directly or through a merchant server, for checking a validity of the generated current authentication code and validation or rejection of the payment transaction as a function of the validity of the generated current authentication code.

2. The method for securing processing according to claim 1, further comprising obtaining a value of occurrence of implementation of the method for securing processing, and when the value indicates a first occurrence of implementation of the method, the method further comprises creating a piece of data representing a link between the communications terminal and a transaction processing server, called a piece of reference authentication data.

3. The method for securing processing according to claim 2, wherein creating the piece of reference authentication data between the communications terminal and the transaction processing server comprises:

obtaining the piece of identification data of the communications terminal;

obtaining the piece of authentication data for the user with whom the communications terminal is associated;

encrypting the identification data of the communications terminal and the authentication data of the user, and delivering the piece of reference authentication data; and transmitting the piece of reference authentication data to the transaction processing server.

4. The method for processing, according to claim 2, further comprising, during the reception, by the transaction processing server, of the data coming from the at least one entry area, at least one act of comparing at least one piece of data transmitted within the entry area and the piece of reference authentication data, and delivering an assertion of validation of the transaction.

5. The method for securing processing according to claim 1, wherein generating the current authentication code having the bank card verification code format comprises formatting the current authentication code to have a size corresponding to a size accepted by the pre-selected entry area corresponding to the entry area for the bank card verification code.

6. A communications terminal comprising:
a display screen;
a contactless data reading device; and
a processor for processing transactional data during a payment transaction and a non-transitory computer-readable medium comprising instructions stored thereon which when executed by the processor configure the communications terminal to run a processing application performing acts comprising:
detecting a display, made by a requesting application, of a payment data entry form comprising at least one entry area for a piece of payment data on the display screen of the communications terminal, the requesting application having initiated the payment transaction;
in response to the detecting, activating the contactless data reading device;
in response to the detecting, taking control of the display made on the display screen by interrupting the requesting application; and, when the display is under control of the processing application:
obtaining, by the contactless data reading device, at least one piece of payment data coming from a contactless payment device;
generating a current authentication code having a bank card verification code format, the generating comprising:
obtaining a piece of identification data of the communications terminal;
obtaining a piece of authentication data of a user with whom the communications terminal is associated; and
generating the current authentication code using a symmetric bilinear coupling function, as a function of the piece of identification data of the communications terminal and the piece of authentication data of the user, the symmetric bilinear coupling function relying on Barreto-Naehrig curves;
filling the at least one entry area of the payment data entry form with the at least one piece of payment data previously obtained;
filling a pre-selected entry area of the payment data entry form corresponding to an entry area for a bank card verification code with the generated current authentication code;
returning control of the display to the requesting application; and
further configure the communications terminal to transmit, upon validation of the payment data entry form, via the requesting application, the at least one piece of payment data and the generated current authentication code to a transaction processing server, either directly or through a merchant server, for checking a validity of the generated current authentication code and validation or rejection of the payment transaction as a function of the validity of the generated current authentication code.

7. The communications terminal according to claim 6, wherein generating the current authentication code having the bank card verification code format comprises formatting the current authentication code to have a size corresponding to a size accepted by the pre-selected entry area corresponding to the entry area for the bank card verification code.

8. A non-transitory computer-readable medium comprising a computer program product stored thereon, which comprises program code instructions for executing a method for securing a processing of transactional data during a payment transaction when the instructions are executed by a processor of a communications terminal comprising a contactless data reading device, the instructions configuring the communications terminal to run a processing application implementing the following:
detecting a display, made by a requesting application, of a payment data entry form comprising at least one entry area for a piece of payment data on a display screen of the communications terminal, the requesting application having initiated the payment transaction;
in response to the detecting, activating the contactless data reading device;
in response to the detecting, taking control of the display made on the display screen by interrupting the requesting application; and, when the display is under control of the processing application:
obtaining, by the contactless data reading device, at least one piece of payment data coming from a contactless payment device;
generating a current authentication code having a bank card verification code format, the generating comprising:
obtaining a piece of identification data of the communications terminal;
obtaining a piece of authentication data of a user with whom the communications terminal is associated; and
generating the current authentication code using a symmetric bilinear coupling function, as a function of the piece of identification data of the communications terminal and the piece of authentication data of the user, the symmetric bilinear coupling function relying on Barreto-Naehrig curves;
filling the at least one entry area of the payment data entry form with the at least one piece of payment data previously obtained;
filling a pre-selected entry area of the payment data entry form corresponding to an entry area for a bank card verification code with the generated current authentication code;
returning control of the display to the requesting application; and
the instructions further configuring the communications terminal to transmit, upon validation of the payment data entry form, via the requesting application, the at least one piece of payment data and the generated current authentication code to a transaction processing server, either directly or through a merchant server, for checking a validity of the generated current authentication code and validation or rejection of the payment transaction as a function of the validity of the generated current authentication code.

9. The non-transitory computer-readable medium according to claim 8, wherein generating the current authentication code having the bank card verification code format comprises formatting the current authentication code to have a size corresponding to a size accepted by the pre-selected entry area corresponding to the entry area for the bank card verification code.

* * * * *